(12) United States Patent
Bahar et al.

(10) Patent No.: US 11,213,785 B2
(45) Date of Patent: Jan. 4, 2022

(54) CARBON DIOXIDE ENVIRONMENTAL CONTROL SYSTEM

(71) Applicant: Xergy Inc., Harrington, DE (US)

(72) Inventors: Bamdad Bahar, Georgetown, DE (US); Jacob Zerby, Harbeson, DE (US)

(73) Assignee: Xergy Inc., Harrington, DE (US)

( * ) Notice: Subject to any disclaimer, the term of this patent is extended or adjusted under 35 U.S.C. 154(b) by 411 days.

(21) Appl. No.: 16/254,391

(22) Filed: Jan. 22, 2019

(65) Prior Publication Data

US 2019/0151796 A1    May 23, 2019

Related U.S. Application Data

(63) Continuation-in-part of application No. 15/800,259, filed on Nov. 1, 2017, now abandoned, which is a
(Continued)

(51) Int. Cl.
| | |
|---|---|
| *B01D 53/32* | (2006.01) |
| *C25B 13/08* | (2006.01) |
| *B01D 69/12* | (2006.01) |
| *B01D 71/28* | (2006.01) |
| *B01D 71/80* | (2006.01) |
| *B01D 71/72* | (2006.01) |
| *F25B 9/00* | (2006.01) |
| *C25B 9/23* | (2021.01) |
| *C25B 11/081* | (2021.01) |

(Continued)

(52) U.S. Cl.
CPC .......... *B01D 53/326* (2013.01); *B01D 69/12* (2013.01); *B01D 69/125* (2013.01); *B01D 71/28* (2013.01); *B01D 71/72* (2013.01); *B01D 71/80* (2013.01); *C25B 9/23* (2021.01); *C25B 11/081* (2021.01); *C25B 13/08* (2013.01); *F25B 9/00* (2013.01); *B01D 67/009* (2013.01); *B01D 67/0083* (2013.01); *B01D 67/0093* (2013.01); *B01D 69/02* (2013.01); *B01D 2257/504* (2013.01); *B01D 2259/4508* (2013.01); *B01D 2259/4575* (2013.01); *B01D 2313/345* (2013.01); *B01D 2325/16* (2013.01); *B01D 2325/26* (2013.01); *B01D 2325/42* (2013.01); *C08G 61/02* (2013.01); *C08G 61/10* (2013.01); *C08G 2261/143* (2013.01); *C08G 2261/312* (2013.01); *C08G 2261/3424* (2013.01); *C08G 2261/516* (2013.01); *H02K 9/10* (2013.01)

(58) Field of Classification Search
CPC ................. C25B 3/26; B01D 53/326
See application file for complete search history.

(56) References Cited

U.S. PATENT DOCUMENTS

| | | | | |
|---|---|---|---|---|
| 2009/0159456 A1* | 6/2009 | Littau | ................. | B01D 53/326 205/555 |
| 2015/0241091 A1* | 8/2015 | Bahar | .................... | F04B 19/20 62/115 |

* cited by examiner

*Primary Examiner* — Ciel P Contreras
(74) *Attorney, Agent, or Firm* — Invention To Patent Services; Alex Hobson

(57) ABSTRACT

An electrochemical system utilizes an anion conducting layer disposed between an anode and a cathode for transporting a working fluid. The working fluid may include carbon dioxide that is dissolved in water and is partially converted to carbonic acid that is equilibrium with bicarbonate anion. An electrical potential across the anode and cathode creates a pH gradient that drives the bicarbonate anion across the anion conducting layer to the cathode, wherein it is reformed into carbon dioxide. Therefore, carbon dioxide is pumped across the anion conducting layer.

20 Claims, 19 Drawing Sheets

Related U.S. Application Data continuation-in-part of application No. 15/448,734, filed on Mar. 3, 2017, now abandoned.

(60) Provisional application No. 62/416,141, filed on Nov. 1, 2016, provisional application No. 62/430,833, filed on Dec. 6, 2016, provisional application No. 62/303,294, filed on Mar. 3, 2016, provisional application No. 62/619,771, filed on Jan. 20, 2018.

(51) Int. Cl.
*H02K 9/10* (2006.01)
*C08G 61/10* (2006.01)
*B01D 67/00* (2006.01)
*B01D 69/02* (2006.01)
*C08G 61/02* (2006.01)

Anode equation $CO_2 + H_2O \longleftrightarrow H_2CO_3 \longleftrightarrow H^+ + HCO_3^-$ Cathode equation $H^+ + HCO_3^- \longleftrightarrow H_2CO_3 \longleftrightarrow CO_2 + H_2O$ Anode equation $CO_2 + H_2O \leftrightarrow H_2CO_3 \leftrightarrow H^+ + HCO_3^-$ Cathode equation $H^+ + HCO_3^- \leftrightarrow H_2CO_3 \leftrightarrow CO_2 + H_2O$

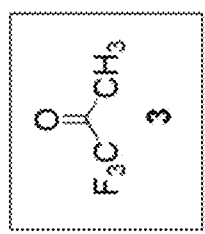
FIG. 21
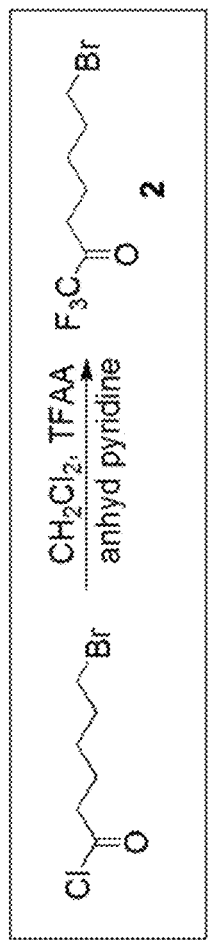
FIG. 22
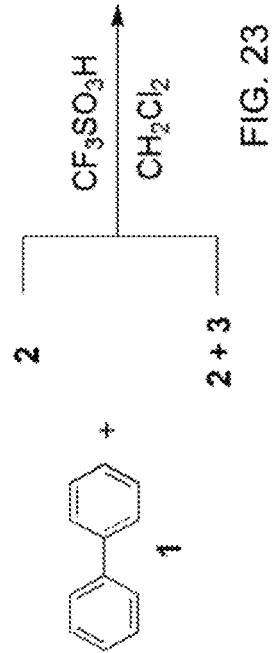
FIG. 23
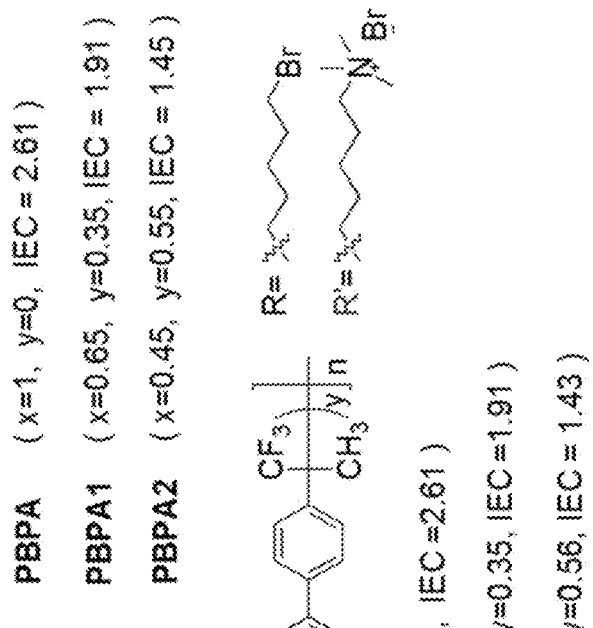
FIG. 24
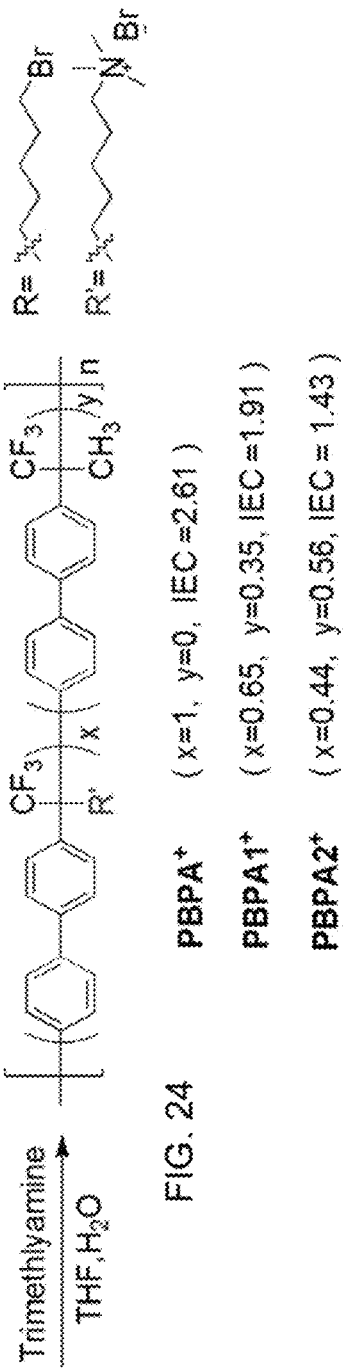

CARBON DIOXIDE ENVIRONMENTAL CONTROL SYSTEM

CROSS-REFERENCE TO RELATED APPLICATIONS

This application is also a continuation in part of U.S. patent application Ser. No. 15/800,259, filed on Nov. 1, 2017, entitled Anionic Electrochemical Compressor and Refrigeration System Employing Same and currently pending, which claims the benefit of priority to U.S. provisional patent application No. 62/416,141, filed on Nov. 1, 2016 and entitled Anionic Ionic Exchange Membranes, and U.S. provisional patent application No. 62/430,833, filed on Dec. 6, 2016 and entitled Anionic Electrochemical Compressor and Refrigeration System; application Ser. No. 15/800,259 is a continuation in part of U.S. patent application Ser. No. 15/448,734, filed on Mar. 3, 2017, entitled Anion Exchange Polymers and Anion Exchange Membranes Incorporating Same and currently pending, which claims the benefit of priority to U.S. provisional application No. 62/303,294, filed on Mar. 3, 2016; this application also claims the benefit of provisional application No. 62/619,771, filed on Jan. 20, 2018 and entitled Carbon Dioxide Environmental Control System; the entirety of all applications are hereby incorporated by reference herein.

BACKGROUND OF THE INVENTION

Field of the Invention

The invention relates to environmental control systems that transfers carbon dioxide between enclosures.

Background

There is significant global interest in carbon dioxide, $CO_2$ (R-744), as a refrigerant because of global warming issues concerning current refrigerants and increasing regulations in the United States. Carbon dioxide can offer comparable system efficiency when applied in a subcritical cascade refrigeration cycle, which can be applied in supermarket applications. Interestingly, Coca-Cola has recently announced the conversion of most its beverage dispensing units to carbon dioxide, $CO_2$ (R-744), based mechanical compression systems. In addition, many U.S. original equipment manufacturers, OEM's, who serve the supermarket refrigeration industry have begun to test R-744 systems. Demonstrating the feasibility of carbon dioxide compression with electrochemical compression technology would have an immediate market opportunity. Unfortunately, the use of carbon dioxide as a refrigerant in mechanical compressors requires high pressures and high compression ratios, such as 100:1, which are difficult to achieve mechanically. Mechanical compressors are noisy and prone to mechanical malfunction and wear.

Developers of mechanical compressors are quick to remind their equipment manufacturers that carbon dioxide compression involves supersonic flow rates, and requires special stainless steel materials to withstand degradation due to the flow rates.

Carbon dioxide is also a fantastic solvent for organic compounds. And this means that every component that meets carbon dioxide needs to be carefully specified to minimize degradation from carbon dioxide contact. This means gaskets, seals, valves, adhesives etc. all need to be carefully selected. It is important to recognize that components used in the system that can operate with carbon dioxide contact cannot be too expensive or impractical for commercial integration. Thus, in resolving engineering issues, cost must always be at the forefront of technology decisions being made.

The compression of carbon dioxide is both a technological opportunity and problem. On the one hand, there is a rise in use of carbon dioxide compressors. They are now being widely adopted for heating and cooling applications, in sequestration strategies for carbon dioxide emissions in power plants, in chemical processing using super-critical carbon dioxide as a solvent and in low temperature food and chemical processing. On the other hand, compressing carbon dioxide presents two major problems. First, there is a requirement for high pressure and high compressor temperature and ratios. Second, compressing carbon dioxide is not easy. There is a need for significant improvement in carbon dioxide compression technology.

SUMMARY OF THE INVENTION

The invention is directed to an anion electrochemical compressors and refrigeration systems employing said compressor and particularly those that utilize carbon dioxide as a compressible refrigerant.

Electrochemical compression (ECC) offers a novel route to carbon dioxide compression using novel anionic membranes which would be disruptive and transformational for the global refrigeration industry. Electrochemical compressors are noiseless, solid-state, i.e. no moving parts, modular and scalable. In addition, they are inherently more efficient. Improvements in efficiency would translate immediately to significant reduction in energy use and therefore lower operating costs. In many commercial applications, noise is also a critical issue.

This innovation would expand the use of carbon dioxide compressors to wider scale markets and assist the U.S. in meeting its global obligations. The availability of high performance anionic membranes has been a critical impediment to electrochemical compressor development using anionic chemistry routes. Indeed, electrochemical carbon dioxide compression would have been impossible without the use of these recently developed, advanced membranes.

The present invention provides electrochemical methods to compress carbon dioxide utilizing a pH swing absorption-desorption system. Classically, this could be accomplished by having a sorption/desorption chamber above a caustic solution. The sorption/desorption chamber is connected to a carbon dioxide source. The caustic solution absorbs carbon dioxide then the sorption/desorption chamber is isolated and the caustic solution acidified causing carbon dioxide evolution into the sorption/desorption chamber, which is then connected to a carbon dioxide sink. The process is then repeated to effectively pump carbon dioxide from the source to the sink by shifting the pH of the sorbing/desorbing solution. While this process pumps carbon dioxide, it is very inefficient. The present invention provides for the use an anionic membrane with a significant hydroxide/hydronium gradient imposed on it by an outside electric field to act like the cycling sorption/desorption solution. Hydroxyl ions would migrate to the positive electrode and hydronium ions would migrate to the negative electrode. By putting the hydroxyl rich surface of the membrane in contact with carbon dioxide, carbon dioxide will be expelled from the hydronium rich side of the membrane as any bicarbonate ions and or carbonate ions that diffuse toward that side.

Of importance to the present invention is that the diffusion of the carbonate or bicarbonate ions through the membrane and to the acid rich side will be insufficient to generate a significant flux of evolving carbon dioxide and the mechanical integrity of the anionic membranes to withstand the pressure. A sufficient gradient to absorb carbon dioxide from the source will be required.

Electrochemical compression and hydrogen pumping all are based on active electrochemistry. In hydrogen pumping, the hydrogen is oxidized at the anode to protons which migrate through a cationic membrane, such as perfluorosulfonic acid, are reduced on the cathode. In the present invention, the carbon dioxide pumped is not via reduction and oxidation so it is significantly different.

The compression of carbon dioxide is both a technological opportunity and problem. On the one hand, there is a rise in use of carbon dioxide compressors. They are now being widely adopted for heating and cooling applications, in sequestration strategies for carbon dioxide emissions in power plants, in chemical processing using super-critical carbon dioxide as a solvent, in low temperature food and chemical processing. On the other hand, compressing carbon dioxide presents some challenges. There is a requirement for high pressure and high compressor temperature and ratios. There is a need for significant improvement in carbon dioxide compression technology Carbon dioxide is a high-pressure refrigerant where high operating pressures are required for efficient operation. During non-compression phases of mechanical compressors, the ambient temperature can exceed the critical temperature and the pressure can exceed the critical pressure. Hence systems are typically designed to withstand pressures up to 90 bar, or sometimes even equipped with a small standstill condensing units to keep pressures low. At the same time, carbon dioxide has a low compression pressure ratio (20 to 50% less than HFCs and ammonia), which improves volumetric efficiency. With evaporation temperatures in the range of $-55°$ C. to $0°$ C., the volumetric performance of carbon dioxide is, for example, four to twelve times better than that of ammonia which allows compressors with smaller swept volumes to be used.

The triple point and critical point of carbon dioxide are very close to the working range. The critical point may be reached during normal system operation. During system service, the triple point may be reached, as indicated by the formation of dry ice when liquid containing parts of the systems are exposed to atmospheric pressure. Special procedures are necessary to prevent the formation of dry ice during service venting.

The reason that existing carbon dioxide compressor designs are so expensive is, in part, because the overall pressure ratio is 100:1, and, in part, because carbon dioxide requires stainless steel construction in the presence of water vapor. But by far, the most significant impact on cost is an aerodynamic design practice that limits the design pressure ratio per stage on heavier gases such as carbon dioxide.

Standard turbomachinery design practice is to limit the inlet flow Mach number to less than 0.90 at the inducer blade tip to avoid generating shock waves in the blade passages and their accompanying losses. This is typically done by adjusting the stage speed. The Mach number itself is a function of molecular weight and therefore the effect is more pronounced on the heavier-than-air carbon dioxide. This inducer blade tip speed limit results in a pressure ratio per stage limits of approximately 1.7 to 2.0:1 on carbon dioxide.

At these stage pressure ratios, eight stages of compression are typically required to reach an overall pressure ratio of 100:1

Electrochemical Compression

An anionic membrane is used with a significant hydroxide/hydronium ion gradient imposed on it by an outside electric field to act like the cycling sorption/desorption solution. Hydroxyl ions would migrate to the positive electrode and hydronium ions would migrate to the negative electrode. By putting the hydroxyl rich surface of the membrane in contact with carbon dioxide the carbon dioxide is expelled from the hydronium rich side of the membrane as any bicarbonate and or carbonate ions diffuse toward that side.

Ion-Exchange Membranes

At the heart of an electrochemical system is an ion-exchange membrane with two catalytic electrodes. The entire assembly is referred to as a membrane-electrode assembly (MEA). Ion-exchange membranes transport ions across an ion conductive polymeric membrane, often referred to as an 'ionomer membrane.' Ion-exchange membranes are made of a polymeric material attached to charged ion groups, often referred to as an ionomer. Anion-exchange membranes contain fixed cationic groups, such as ammonium or phosphonium, with mobile anions, which provide the ionic conductivity. Cation-exchange membranes contain fixed anionic groups, such as carboxylic or sulfonic acid, with mobile cations, which provide the conductivity. The selectivity of the membranes is due to Donnan equilibrium and Donnan exclusion and not due to physically blocking or electrostatically excluding specific charged species.

Anion Exchange Membranes

Of particular interest for electrochemical carbon dioxide systems are anion exchange membranes or anion conducting layer. Electrochemical cells employing anion exchange membranes may function without the use of platinum-group metal catalysts or acid-resistant metal housings, significantly lowering their cost. Additionally, the ability to transport anions, such as hydroxide or bicarbonate, has great utility in electrochemical carbon dioxide systems.

An exemplary anion conducting polymer comprises quaternary ammonium or phosphonium functional groups, with poly(styrene), poly(phenylene), or poly(arylene) backbones. Rigid, aromatic polymer backbones such as poly(phenylene) or poly(arylene) provide high tensile strength along with resistance to chemical degradation via hydroxide elimination reactions in a highly caustic environment. Ion exchange membranes produced with these ionomers can further be reinforced by porous support materials, such as microporous polytetrafluoroethylene, polyethylene, or polypropylene membranes. Reinforcing the ionomer with the porous support matrix, creates a composite anion exchange membrane. The preferred microporous support for use in the present invention is porous ultra-high molecular weight polyethylene, as it has superior chemical compatibility compared to expanded polytetrafluoroethylene, the standard for reinforced cation exchange membranes and porosity, compared to polypropylene, an alternative polyolefin support. An exemplary ion exchange membrane for use in the present invention comprises a polymer with a poly(arylene) or poly(phenylene) backbone and alkyl or piperidine side chains featuring quaternary ammonium or phosphonium groups for ionic conductivity. In an exemplary embodiment, a solution of this ionomer is impregnated into a microporous polyolefin support for greater reinforcement and stability, especially at lower thickness.

An exemplary anion conducting layer is a composite anion conducting layer comprising an anion conducting polymer that is reinforced by a support material. An even more desirable example of the present invention involves impregnating a microporous polyolefin support material between 5 and 50 microns, with porosity ranging from approximately 50% to 90% and pore size between approximately 20 nm and 1 micron, with a polymer solution comprising a precursor form of the ionomer comprising tertiary amine groups grafted to a poly(arylene) or poly(phenylene) backbone, along with a crosslinking agent such as divalent metal cations, tetramethyl-1,6-hexanediamine, or 4,4'-trimethylenebis(1-methyl-piperidine), and then exposing the dried composite membrane to trimethylamine solution in water or ethanol. The crosslinking can be initiated or accelerated by exposure to high temperatures as well as infrared or ultraviolet radiation.

An exemplary anion conducting layer is an anisotropic anion conducting layer, that has varying properties through the thickness of the layer, and may comprise a series of thin films fused together to create an anisotropic membrane. Typically, quaternary ammonium ions are the cationic site and the backbone is varied, however it is possible to create cationic species with phosphonium as the cationic center. The number of layers can be altered as well as step changes in the blend ratio to generate membranes of significantly anisotropic internal structures.

The anion conducting polymer within an anion conducting layer may be crosslinked using a crosslinking agent or compound. Anion conducting polymers, such as within a composite anion conducting layer, may be crosslinked to increase their mechanical and chemical stability, especially in hydrated conditions. In the case of an anionic ionomer with functional quaternary ammonium groups, crosslinks may be made between polymer chains by linking quaternary ammonium groups together with crosslinking agents such as polyamines, blocked polyamines, dicyanodiamides, divalent metal cations, tetramethyl-1,6-hexanediamine, 4,4'-trimethylenebis(1-methyl-piperidine), or 4,4'-(1,3-Propanediyl)bis(1-methyl-piperidine). A composite anion conducting layer may be formed by imbibing a support material with a polymer solution containing the ionomer along with one of the above crosslinking agents at a prescribed molar ratio of crosslinking agent to functional ionic groups. Any suitable anion conducting membrane may be used in the present invention. These membranes are characterized by nanoscale channels that essentially hold water and conduct anions, such as hydroxyl ions. These new anion exchange membranes have demonstrated the ability to achieve high conductivity for anions or high permselectivity.

Electrochemical Movement of Carbon Dioxide

Carbon dioxide reacts with water. The carbon atom of carbon dioxide is electron poor with an oxidation state of IV. The electron rich oxygen of water donates an electron pair to the carbon. After proton transfer from water to an oxygen of the carbon dioxide unit, carbonic acid is formed as shown in by equation:

$$CO_2 + H_2O \leftrightharpoons H_2CO_3$$

The reaction between water and dissolved carbon dioxide is reversible and rapid. Carbonic acid is in equilibrium with the bicarbonate anion. The bicarbonate ion (hydrogen-carbonate ion) is an anion with the empirical formula $HCO_3^-$ and a molecular mass of 61.01 Daltons; it consists of one central carbon atom surrounded by three oxygen atoms in a trigonal planar arrangement, with a hydrogen atom attached to one of the oxygens. It is isoelectronic with nitric acid $HNO_3$. The bicarbonate ion carries a negative one formal charge and is the conjugate base of carbonic acid $H_2CO_3$; at the same time, it is the conjugate acid of $CO_3^{-2}$, the carbonate ion, as shown by these equilibrium reactions:

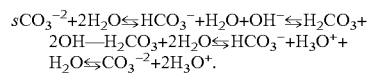

The hydration equilibrium constant at 25° C. is called Kh, which in the case of carbonic acid is $[H_2CO_3]/[CO_2] \sim 1.7 \times 10^{-3}$ in pure water. Hence, most the carbon dioxide is not converted into carbonic acid, remaining as $CO_2$ molecules. In the absence of a catalyst, the equilibrium is reached quite slowly. The rate constants are $0.039\ s^{-1}$ for the forward reaction ($CO_2 + H_2O \rightarrow H_2CO_3$) and $23\ s^{-1}$ for the reverse reaction ($H_2CO_3 \rightarrow CO_2 + H_2O$). The addition of two molecules of water to $CO_2$ would give orthocarbonic acid, $C(OH)_4$, which exists only in minute amounts in aqueous solution.

Addition of base to an excess of carbonic acid gives bicarbonate anions, (hydrogen carbonate). With excess base, carbonic acid reacts to give carbonate salts. Bicarbonate ions ($HCO_3^-$) are anions and therefore can travel through an appropriate electrolyte, such as an aqueous solution or solid polymer anion exchange membrane.

When an electric potential is established through water, it causes positive ions, including the inherent hydrogen ions $H_3O^+$, to move towards the negative electrode, cathode, and negative ions, including the inherent hydroxide ions $OH^-$, to move towards the positive electrode, anode. This is the nomenclature conventionally used in an electrolytic cell. At sufficient potential difference, this may cause electrolysis with oxygen gas being produced at the anode and hydrogen gas produced at the cathode. Since we do not want hydrogen or oxygen to evolve, this system will aim to operate with minimal potential difference—which will also provide lowest energy utilization i.e. high operating efficiency.

Generally, the water next to the electrodes will change pH due to the ions produced or consumed. If the electrode compartments are separated by a suitable porous membrane then the concentration of $H_3O^+$ in the anolyte and $OH^-$ in the catholyte, and hence the increase in the respective conductivities are both expected to increase more than if there is free mixing between the electrodes, when most of these ions will neutralize each other. Small but expected differences in the solutions' pH next to the anode, anolyte, and cathode, catholyte, cause only a slight change to the overall potential difference required (1.229 V). Increasing the acid content next to the anode due to the $H_3O^+$ produced will increase its electrode potential (for example: pH 4 E=+0.992 V) and increasing the alkaline content next to the cathode due to the $OH^-$ produced will make its electrode potential more negative (for example: pH 10 E=−0.592 V). If the anode reaction is forced to run at pH 14 and the cathode reaction is run at pH 0 then the electrode potentials are +0.401 V and 0 V respectively (see above right).

Anode pH 0 $2H_2O \rightarrow O_2 + 4H^+ + 4e^-$ $E°=+1.229\ V$   (a)

Anode pH 14 $4OH^- \rightarrow O_2 + 2H_2O + 4e^-$ $E°=+0.401\ V$   (b)

Cathode pH 0 $4H^+ + 4e^- \rightarrow 2H_2$ $E°=0.0\ V$   (c)

Cathode pH 14 $4H_2O + 4e^- \rightarrow 2H_2 + 4OH^-$ $E°=-0.828\ V$   (d)

Thus, by utilizing an electrochemical system, the dissolution of carbon dioxide into water is enhanced and equilibrium is shifted towards increased production of carbonic acid and bicarbonate with the presence of OH⁻ ions at the anode. The carbonic acid or bicarbonate ions are then split into carbon dioxide and water at the cathode with the presence of H⁺ ions (protons), and high pressure carbon dioxide is released. Temperature effects should also be considered. Since the carbon dioxide entering the anode compartment will be coming from an evaporator, it will have a low temperature (i.e. solubility will be enhanced), and excitation with protons at the cathode will enhance carbon dioxide evolution. The electrochemical process therefore accelerates the natural process of carbon dioxide dissolution and evolution. It aids the process.

Carbon Dioxide-Carbonic Acid Equilibrium

Carbonic acid is formed when atmospheric carbon dioxide is dissolved in water. The chemical equilibria are:
1) Gas dissolution;
2) Carbonic acid formation; and
3) Carbonic acid equilibrium In an open system, the partial pressure of $CO_2$ (g) is relatively constant at P $(CO_2)$=0.000355 Atmosphere. The solubility of gases decreases with increasing temperature. The electron rich oxygen of water donates an electron pair to the carbon. After proton transfer from water to an oxygen of the $CO_2$ unit, carbonic acid is formed. The reaction between water and dissolved carbon dioxide is reversible and rapid. Carbonic acid is in equilibrium with the bicarbonate anion.

Carbonic acid is a chemical compound with the chemical formula $H_2CO_3$ (equivalently $CO(OH)_2$). It is also a name sometimes given to solutions of carbon dioxide in water (carbonated water), because such solutions contain small amounts of $H_2CO_3$. In physiology, carbonic acid is described as volatile acid or respiratory acid, because it is the only acid excreted as a gas by the lungs. It plays an important role in the bicarbonate buffer system to maintain acid-base homeostasis.

Electrodes

Standard electrodes for Water electrolysis can be used, since we are essentially simply driving a potential across the cell to enhance carbonic acid formation and dissociation. However, there is literature that suggest that carbonic acid formation can be further enhanced with the presence of high surface area catalysts containing copper and/or palladium.

It is anticipated that once the cell is operating without catalyst that further enhancements to operating rates will be investigated with the use of catalysts. Xergy has produced electrodes for water electrolysis for its own water electrolyzer program.

Ammonia as a Working Fluid

A similar approach can be taken by using Ammonia as a working fluid. Similarly, a chemical reaction also occurs when ammonia dissolves in water. In aqueous solution, ammonia acts as a base, acquiring hydrogen ions from $H_2O$ to yield ammonium and hydroxide ions. In contrast, the ammonium ion acts as a weak acid in aqueous solution because it dissociates to form hydrogen ion and ammonia. Therefore, in a similar manner to $CO_2$, adsorption and desorption with the aid of an electrochemical cell pumps ammonia from one side to the other, and thus enables ammonia compression.

The environmental control system as described herein may be used to reduce the carbon dioxide in closed or inadequately ventilated environments or enclosures, such as within vehicles, including land motor vehicles, cars, trucks, busses, aircraft including airplanes and helicopters, aerospace vehicles including spacecraft, satellites, and space stations, watercraft including, boats, ships, and submarines, enclosed work spaces including offices and work areas and the like. Some enclosures may have little to air exchange such as a vehicle, aircraft of submarine and prolonged stays in these enclosures may raise the carbon dioxide levels to undesirable and unhealthy levels. An exemplary environmental control system may be used in a greenhouse to produce carbon dioxide that is reduce through photosynthesis of the plants therein.

This application incorporates by reference in their entirety, the following applications: U.S. application Ser. No. 15/800,259, filed on Nov. 1, 2017 and entitled Anionic Electrochemical Compressor and Refrigeration System Incorporating Same, U.S. application Ser. No. 15/627,577, filed on Jun. 20, 2017 and entitled Electrochemical Compression of Ammonia Using Ion Exchange Membranes, U.S. application Ser. No. 15/448,734 filed on Mar. 3, 2017 and entitled Anion Exchange Polymers And Anion Exchange Membranes Incorporating Same.

This application incorporates by reference in their entirety, the following applications: U.S. application Ser. No. 15/289,220 filed on Oct. 10, 2016, entitled Electrochemical Heat Transfer System and currently pending, which is a continuation of U.S. application Ser. No. 13/029, 006 filed on Feb. 16, 2011, entitled "Electrochemical Heat Transfer System" and issued as U.S. Pat. No. 9,464,822 on Oct. 11, 2016, which is a continuation-in-part of U.S. application Ser. No. 12/771,620 filed on Apr. 30, 2010, entitled "Self-Contained Electrochemical Heat Transfer System" and issued as U.S. Pat. No. 8,627,671 on Jan. 14, 2014, which claims the benefit of U.S. provisional patent application No. 61/215,131 filed on May 1, 2009, and U.S. application Ser. No. 13/029,006 claims priority to U.S. provisional application No. 61/305,410 filed on Feb. 17, 2010 and entitled "Electrochemical Heat Pump System for Cooling Electronic Components," and to U.S. provisional application No. 61/347,428, filed May 23, 2010 and entitled "Compact Cooling Systems Using Electrochemical Compression,"; U.S. provisional application No. 62/262,845, filed on Dec. 3, 2015, and entitled "Electrochemical Compressor and Refrigeration System Using Same"; U.S. patent application Ser. No. 14/859,267 filed on Sep. 19, 2015 and entitled "Electrochemical Compressor Based Heating Element and Hybrid Hot Water Heater Employing Same", which is a continuation in part of U.S. patent application Ser. No. 13/899,909 filed on May 22, 2013, entitled "Electrochemical Compressor Based Heating Element And Hybrid Hot Water Heater Employing Same" which is now abandoned; U.S. provisional application No. 62/262,845, filed on Dec. 3, 2015, entitled "Electrochemical Compressor and Refrigeration System Using Same"; U.S. patent application Ser. No. 13/725,515 filed on Dec. 21, 2012 and currently pending; Ser. No. 14/859,267 filed on Sep. 19, 2015 and currently pending, Ser. No. 13/943,619 filed on Jul. 16, 2013 and currently pending, Ser. No. 14/630,659 filed on Feb. 25, 2015 and currently pending, Ser. No. 14/712,376 filed on May 14, 2015 and currently pending, and Ser. No. 15/173, 854 filed on Jun. 6, 2016 and currently pending; the entirety of all related applications are hereby incorporated by reference herein.

An anion exchange membrane may be coupled with a water source to provide hydration to the membrane as they can dry out at ambient humidity conditions, lose conductivity, and stop performing under certain conditions. A hydration source may be a water reservoir and a wick that is coupled with the anion exchange membrane. A water source may also be a highly humidified input to the system.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 21 shows an exemplary polymer reaction of the present invention.

FIG. 22 shows an exemplary polymer of the present invention.

FIG. 23 shows an exemplary polymer reaction of the present invention.

FIG. 24 shows an exemplary polymer reaction to functionalize a polymer of the present invention.

Figure 1:
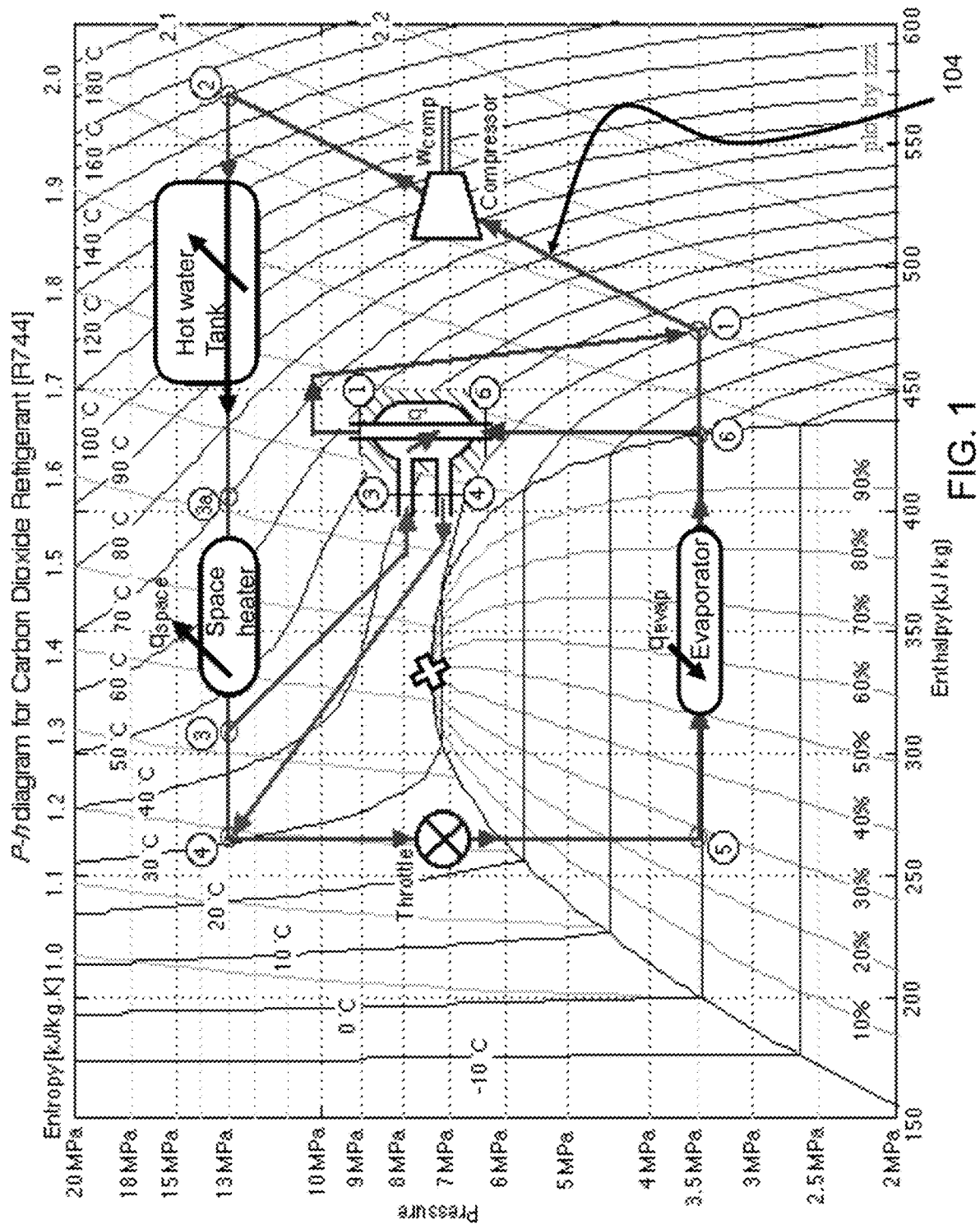
FIG. 1 shows a pressure enthalpy chart and a critical point and the extent of the transcritical fluid region.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

FIG. 1 shows a pressure enthalpy diagram for carbon dioxide refrigerant and a critical point and the extent of the transcritical fluid region. Notice that the compressor does not follow an isentropic process as shown by line 104. This is a practical system with data adapted from a Visteon Corp. automobile a/c design.

Figure 2:
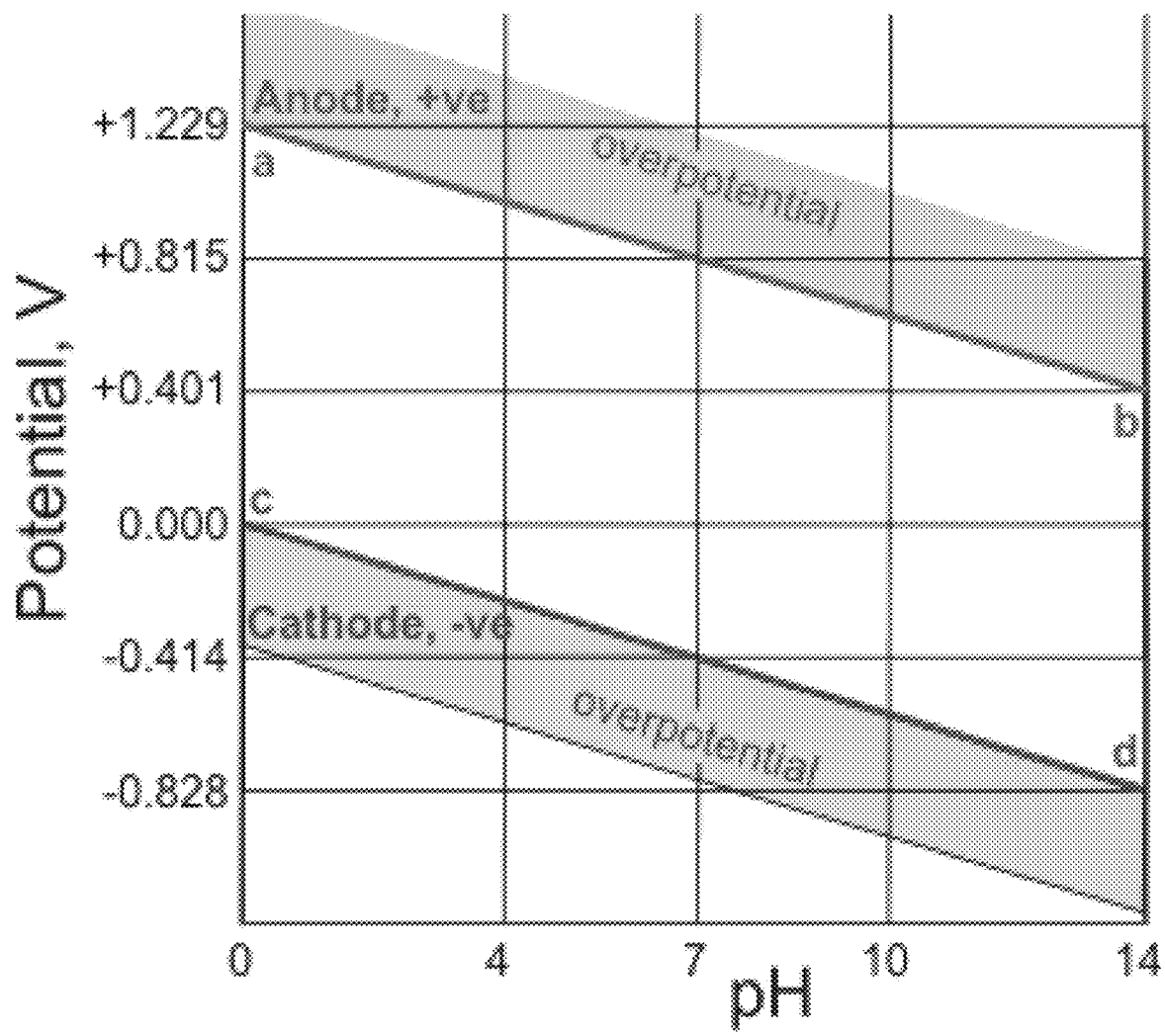
FIG. 2 is a graph of potential versus pH.

FIG. 2 is a graph of potential versus pH and shows how the potential of the anode and cathode can impact the pH of water.

Figure 3:
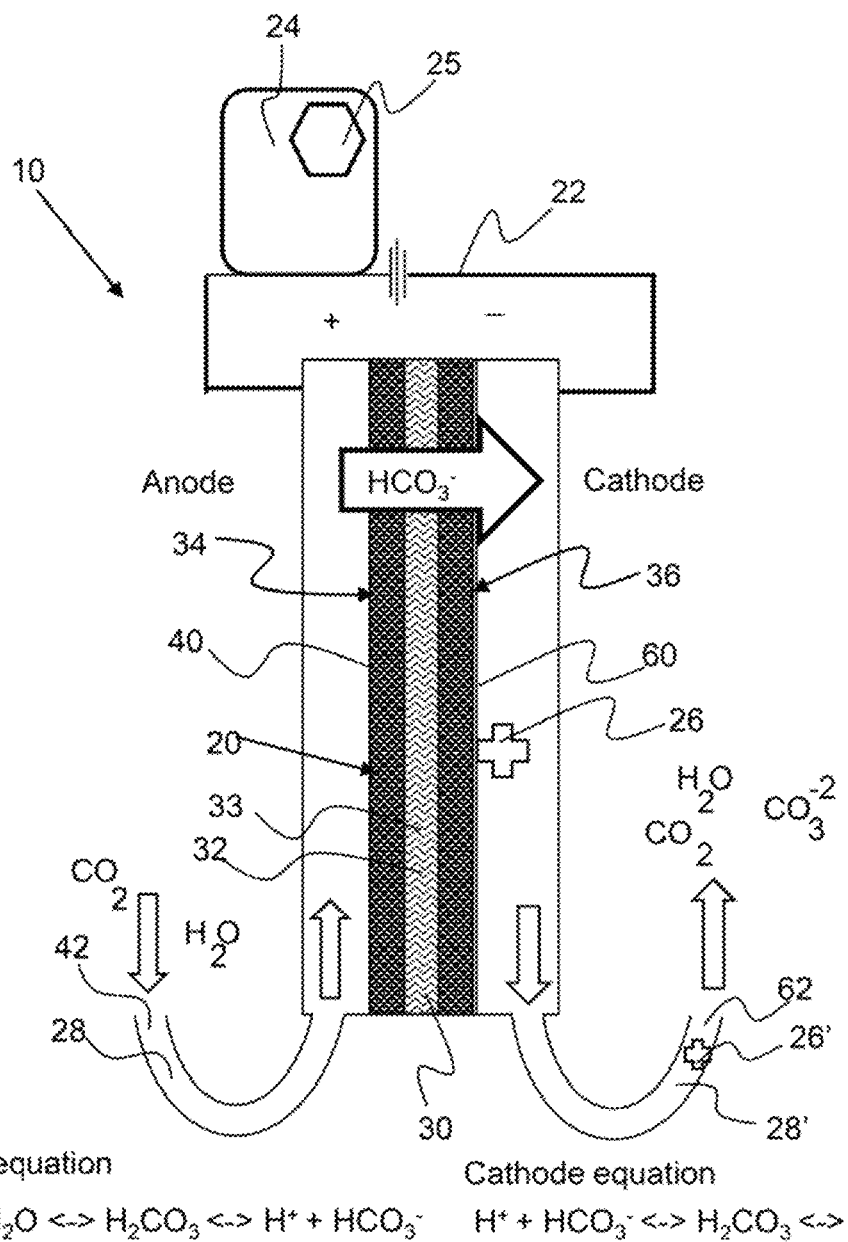
FIG. 3 shows a schematic of a carbon dioxide electrochemical compressor.
Figure 4:
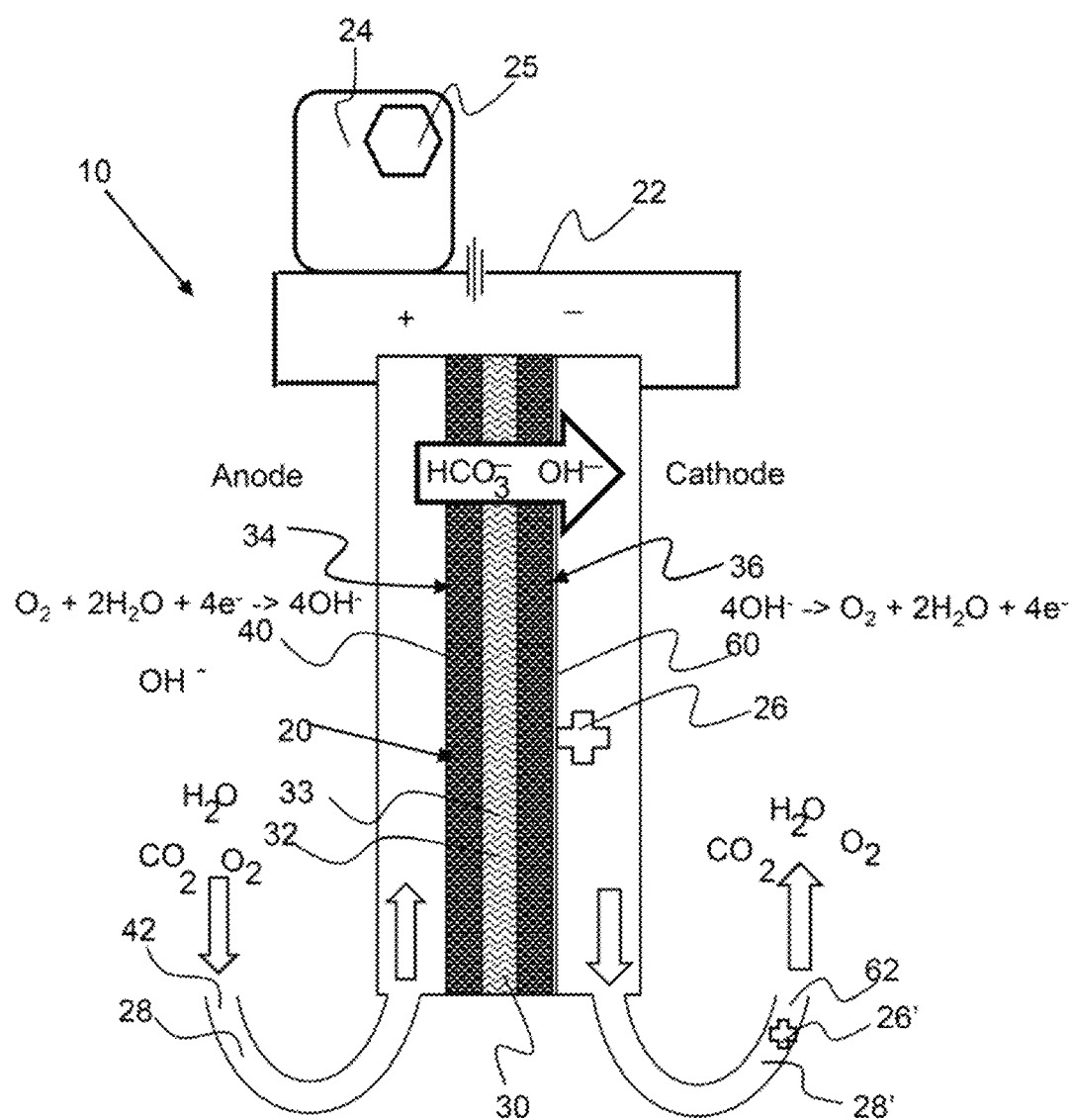
FIG. 4 shows a schematic of a carbon dioxide electrochemical compressor.

Referring now to FIGS. 3 and 4, an exemplary carbon dioxide electrochemical compressor 10 pumps carbon dioxide from the anode 40 to the cathode 60. The exemplary carbon dioxide electrochemical compressor comprises a power supply 22 connected to a membrane electrode assembly 20 comprising an anode 40 and cathode 60 separated by an anion conducting layer 30. The anion conducting layer 30 may comprise an anion conducting polymer 32 and a support material 33, such as a porous polymer material. dioxide from the anode to the cathode. As shown in FIG. 3, the carbon dioxide gas is dissolved in the water, and is partially converted to carbonic acid, which is in equilibrium with bicarbonate anion as shown by the anode equation. The power supply produces a voltage potential between the anode and cathode to change the pH as shown in FIG. 2. The bicarbonate is driven across the anion conducting layer 30 by the gradient in pH from the anode to the cathode and is mobile inside the anion exchange membrane, and diffuses or is transported across the membrane, as shown in FIG. 3. The bicarbonate reacts on the cathode to reform carbon dioxide as shown by the Cathode equation in FIG. 3. As shown in FIG. 4, hydroxyl ions are depleted which drives the equilibrium to the right, or to the formation of carbon dioxide. As shown in FIG. 4, hydroxyl ions are produced at the anode driving the equilibrium to the formation of bicarbonate. The hydroxyl ion formation and depletion are controlled by the potential produced by the power supply across the anode and cathode in the presence of oxygen. The working fluid comprises water, carbon dioxide and oxygen. Therefore, in essence, carbon dioxide is pumped from the anode to the cathode. The voltage potential from the anode to the cathode is provided by a power source and may be controlled by a controller 24 having a microprocessor 25. The controller may control the voltage potential based on a desired or set flow rate of the working fluid as measured by a sensor 26'. Any number of sensors 26, 26' may be configured to measure the flow rate, pH of the working 28, temperature, pressure on the anode or cathode side and the like. A sensor may provide data to the controller and the controller may control the potential across the anode and cathode as a function of the data input from the sensor. The voltage may be oscillated or maintained at a set value for a period of time. The anode may have an input 42 for working fluid 28 and the cathode may have an outlet 62 for the working fluid 28' at a higher pressure than at the anode.

Figure 5:
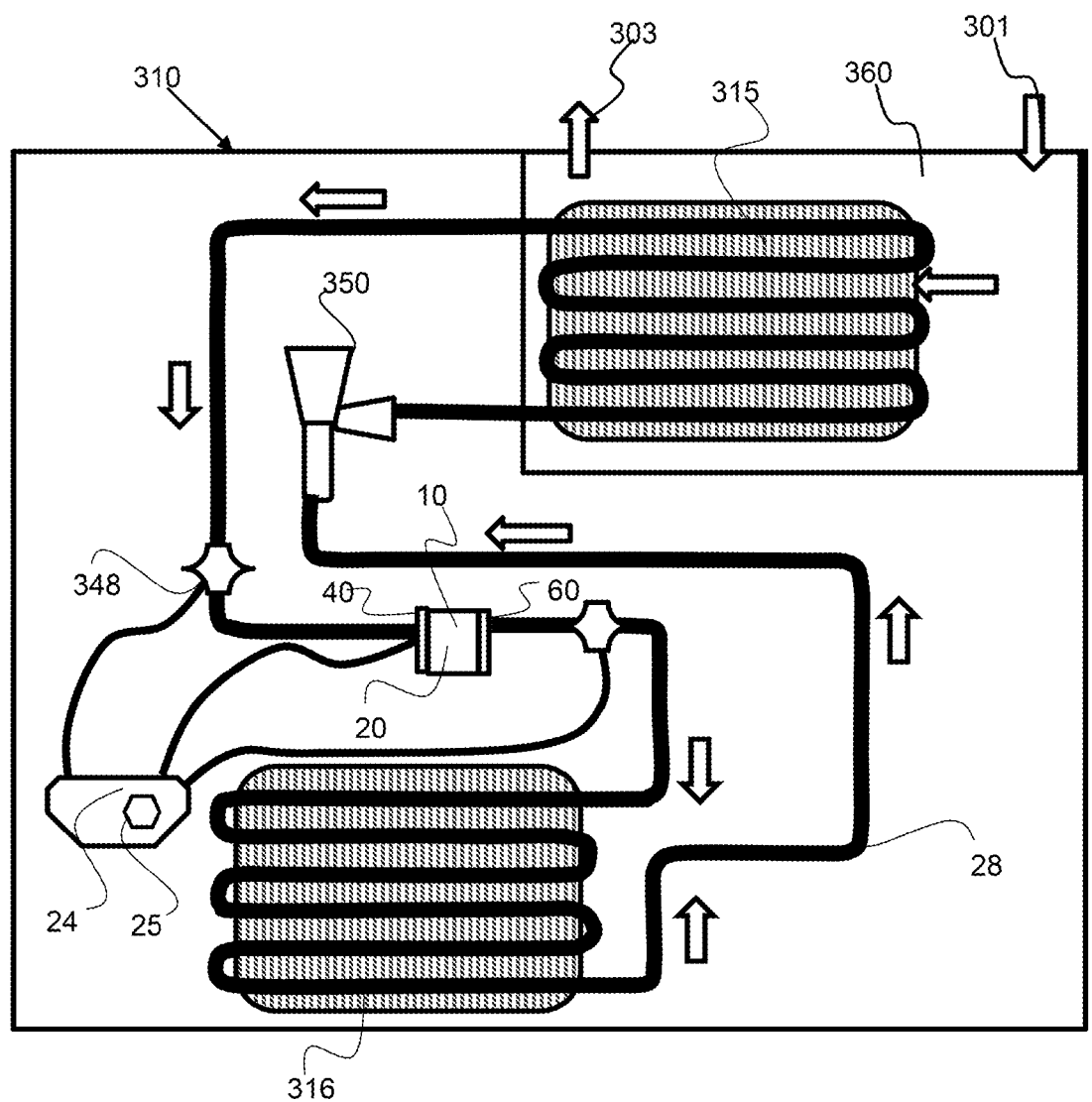
FIG. 5 shows a schematic of an exemplary refrigerant system employing an electrochemical carbon dioxide compressor.

As shown in FIG. 5, an exemplary carbon dioxide electrochemical compressor 10 is configured in a refrigeration system 310 that pumps the working fluid 28, water and carbon dioxide, in a closed loop from the anode 40, through the membrane electrode assembly 20, to the cathode 40 and back to the anode. The refrigeration system may comprise a condenser 316, an evaporator 315 and an expansion valve 350. A controller 24 having a microprocessor 25 may control the voltage across the anode and cathode to control the rate of flow of working fluid through the refrigerant system. The system may have a plurality of valves 348 to control flow and pressure of the working fluid. The refrigerant system may cool a flow of fluid, such as air, that has an inlet 301 and outlet 303 across the evaporator to cool the fluid from the inlet to the outlet. The evaporator may be in an exchange chamber 360.

Figure 6:
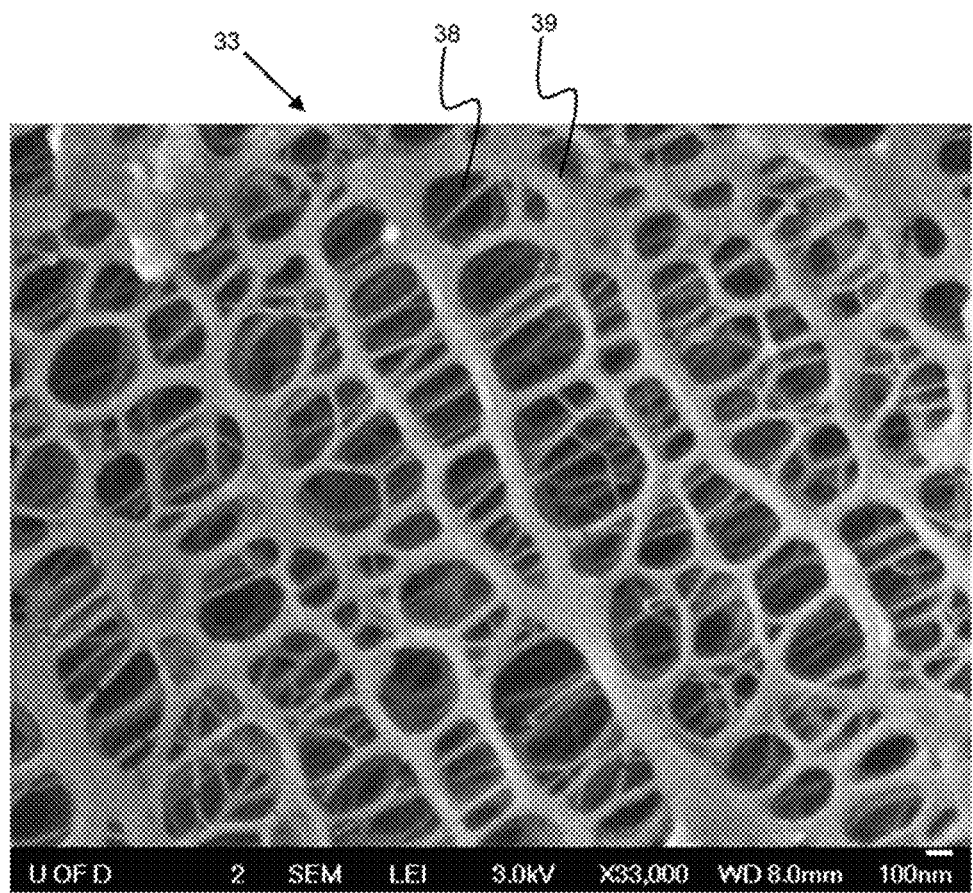
FIG. 6 is a scanning electron microscopy (SEM) image of the face of a microporous polypropylene membrane support.

FIG. 6 shows a scanning electron microscopy image of a support material 33, which is a microporous polypropylene support having pores 38 that extend through the thickness of the layer. The nanoscale morphology of the support material allows hydrophobic domains of the ionomer to segregate around the fibers 39 of the porous support, creating hydrophilic channels for water and anions to flow through.

Figure 7:
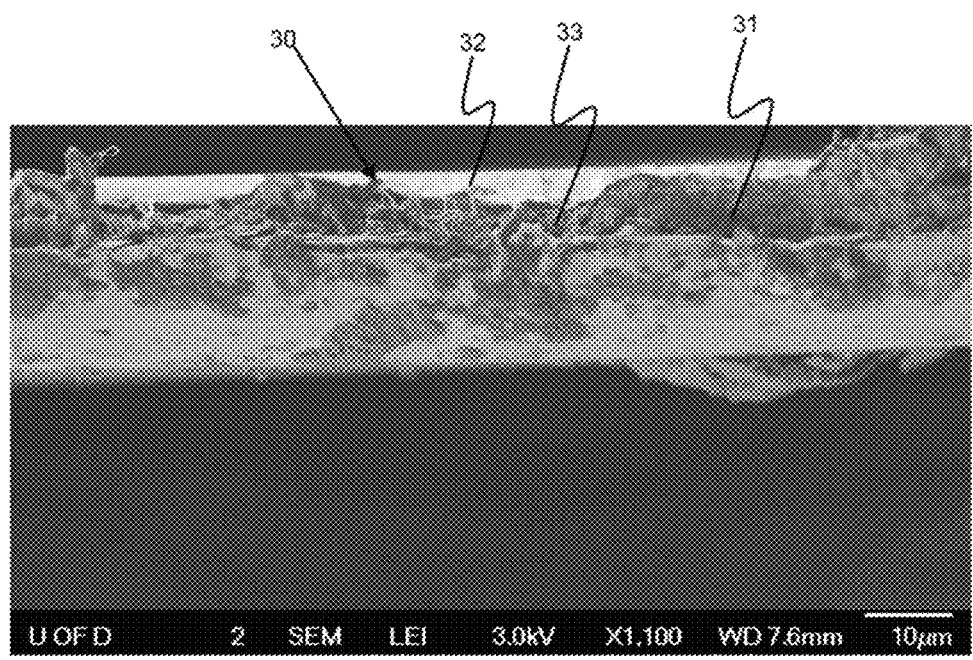
FIG. 7 is a scanning electron microscopy (SEM) image of the cross-section of a composite anion exchange membranes suitable for use in the invention.

FIG. 7 shows a scanning electron microscopy image of the cross-section of an anion conducting layer 30, that is a composite anion exchange membrane 31, having a thickness of no more than about 50 microns, and preferably no more than about 25 microns. The composite anion exchange membrane 31 comprises a support material 33, and an anion conducing polymer 32 attached thereto and therein. Note that the ionomer appears to be well-imbibed; very little, if any, of the porous support material morphology is visible from the cross-section.

Figure 8:
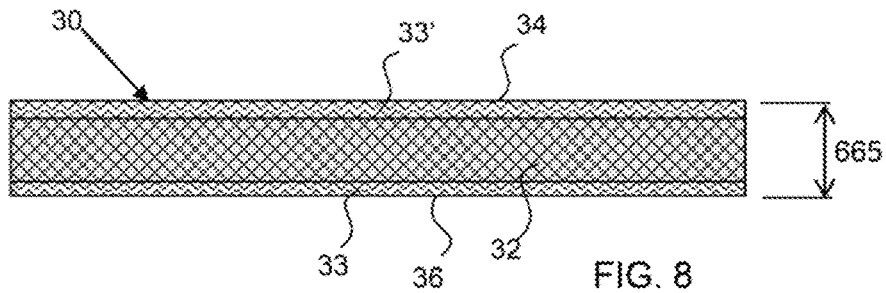
FIG. 8 to 11 show a cross-sectional schematic of anisotropic composite ion exchange membranes.
Figure 9:
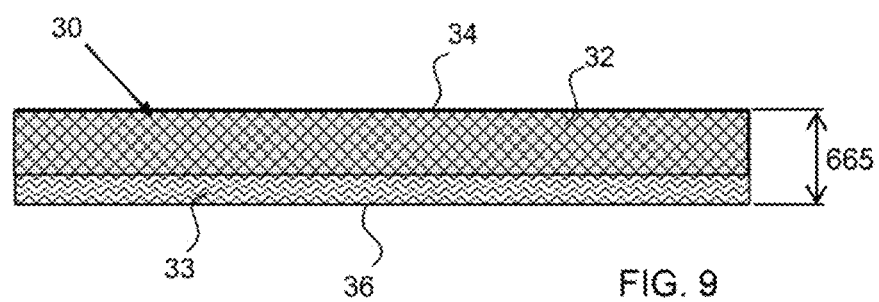
Figure 10:
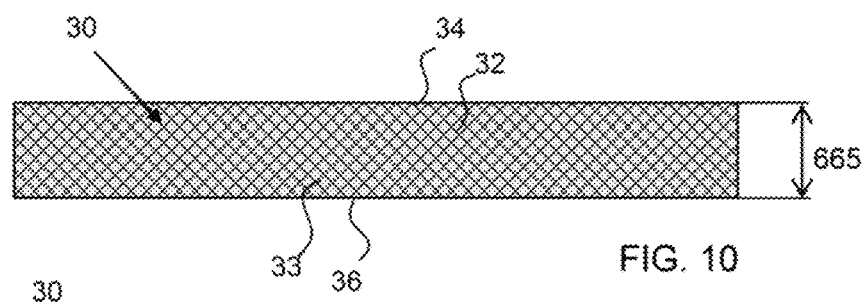
Figure 11:
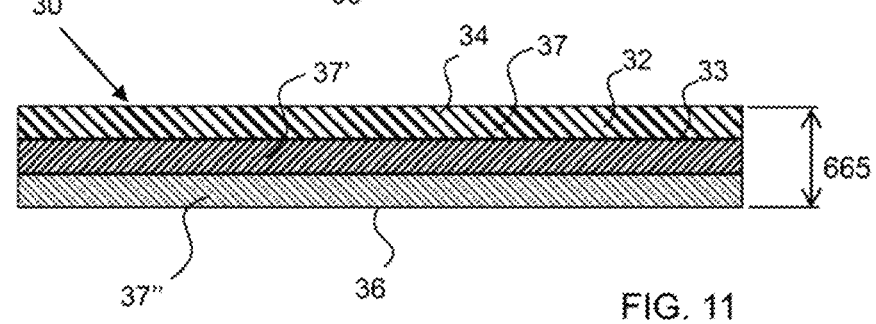

FIGS. 8 to 11 shows examples of anion conducing layers 30. The layers have a thickness 665 and an anion conducting polymer 32 that may be coupled with a support layer 33. The support layer may extend to both the anode side 34 and cathode side 36. The support layer may extend completely through from the anode to the cathode side, as shown in FIG. 8, or may be only on one side, such as the cathode side 36, as shown in FIG. 9. The anion conducting polymer 32 may extend through the support material 33 to both the anode and cathode side as shown in FIG. 10. The anion support material may have a thickness extending from the support material, or buttercoat thickness on the anode and/or cathode side. As shown in FIG. 11, an anion conducting layer 30 may comprises a gradient of properties through the thickness, wherein the properties change from the anode to the cathode side. A layer of anion conduction polymer 37, or layer exposed to the anode, may have high concentration of functional groups, such as quaternary ammonium groups, wherein the mol percent as a function of the anion conducting polymer is high as compared with the mol percent of the anion conducting polymer in the cathode layer 37', or layer exposed to the cathode. The anode layer 37 may be separated from the cathode layer 37" by middle layer 37'. The middle layer may have a concentration of functional groups that is between the concentration of the functional groups of the anode layer and the cathode layer. The layers may be formed together or may be separate layers that are bonded together or attached to form the anisotropic anion conducting layer 30. An anisotropic anion conducting layer may have a support material 33, in one or more of the layers and these layers may have a different concentration of functional groups or different types of functional groups. The concentration gradient of the functional groups in the anion conducting polymer may vary through the thickness of the anion conduction layer 30 by as much as 10 to 1 or more, or about 5 to 1 or more, or about 2 to 1 or more, or about 1.5 to 1 or more and any range between and including the concentration gradient ratios provided. A first layer of an anisotropic anion conducting layer may comprise a concentration of quaternary ammonium groups and a second layer may comprise a concentration of phosphonium groups. The layers may comprise only one type of functional group or a blend of two or more functional groups.

Figure 12:
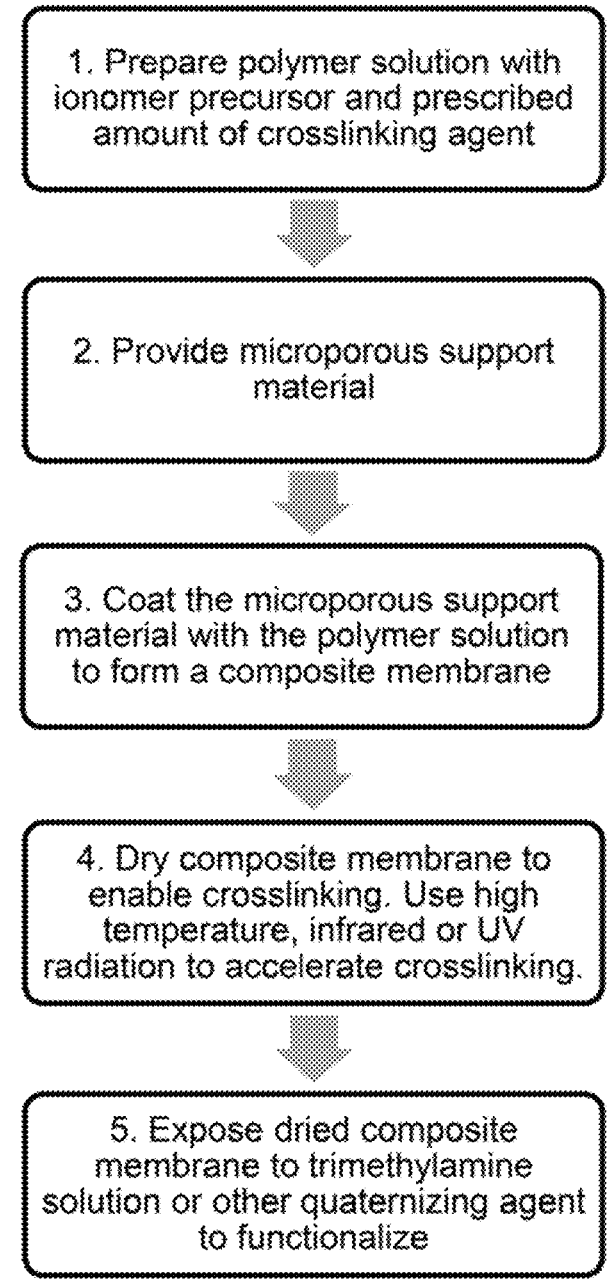
FIG. 12 shows a flow diagram explaining the method of preparing a composite crosslinked anion exchange membrane.

FIG. 12 is a flowchart explaining the method for preparing a composite anion exchange membrane relating to the method claims. As detailed in the diagram, a composite anion conducting layer may be formed by coating or impregnating a porous support material with an anion conducting polymer. The coated anion conducting polymer may at least partially or fully fill the porosity or pores of the porous support material. The polymer solution that is coated in or onto the porous support material may comprise the anion conducting polymer as well as a cross-linking agent. After coating the porous substrate with the polymer solution, the polymer solution may be crosslinked by an increase in temperature or exposure to infrared or ultraviolet (UV) radiation to form a crosslinked polymer. The crosslinked polymer may then be functionalized by the exposure to quaternizing agent to form a composite anion conducting layer.

Figure 13:
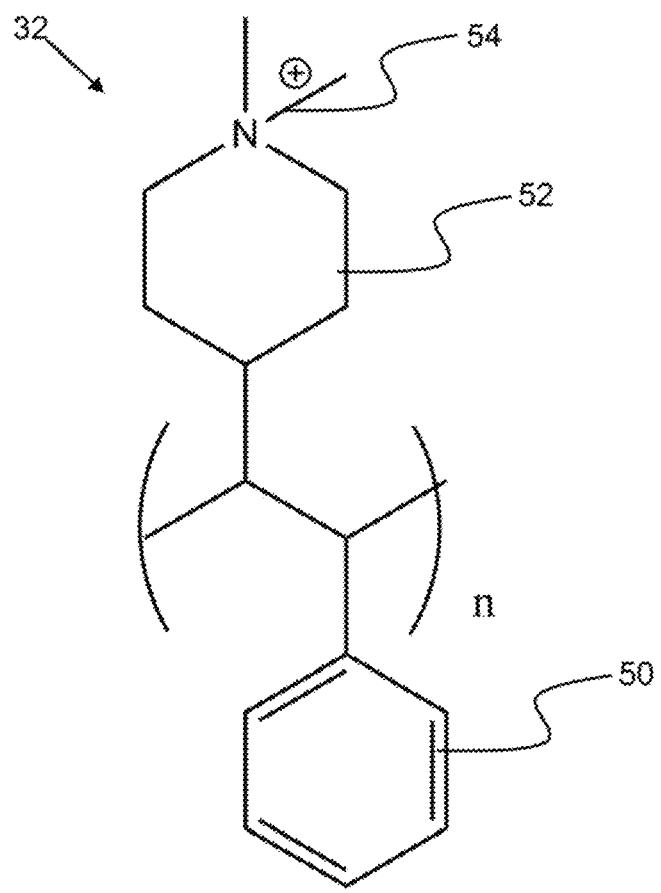
FIGS. 13 to 15 show molecular diagrams for an exemplary anion conducting polymers having a backbone, a side chain and a functional group.
Figure 14:
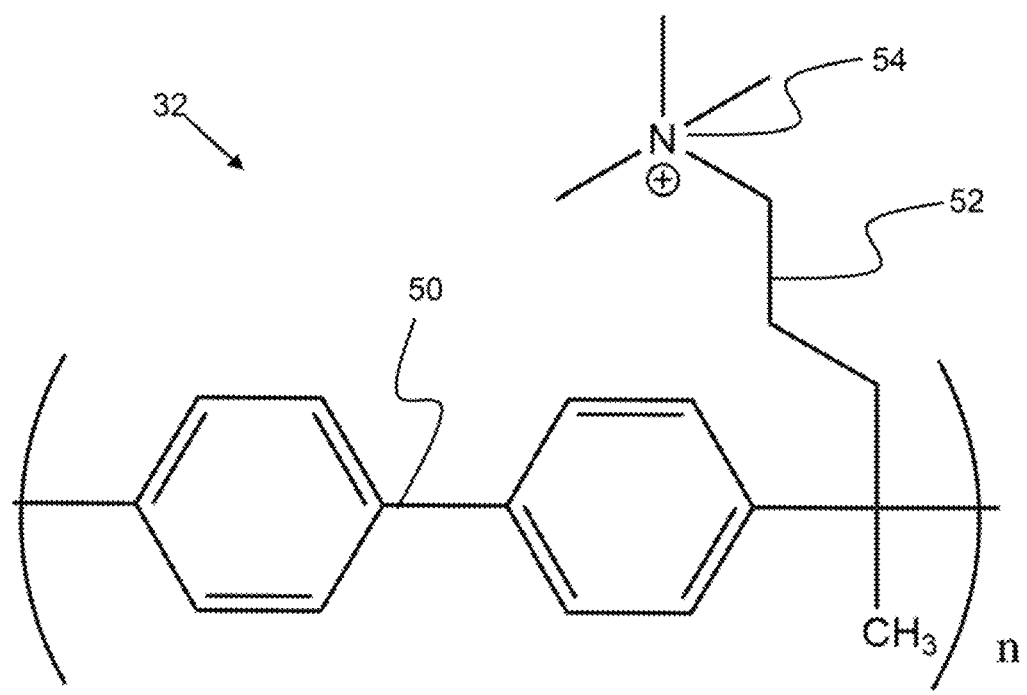
Figure 15:
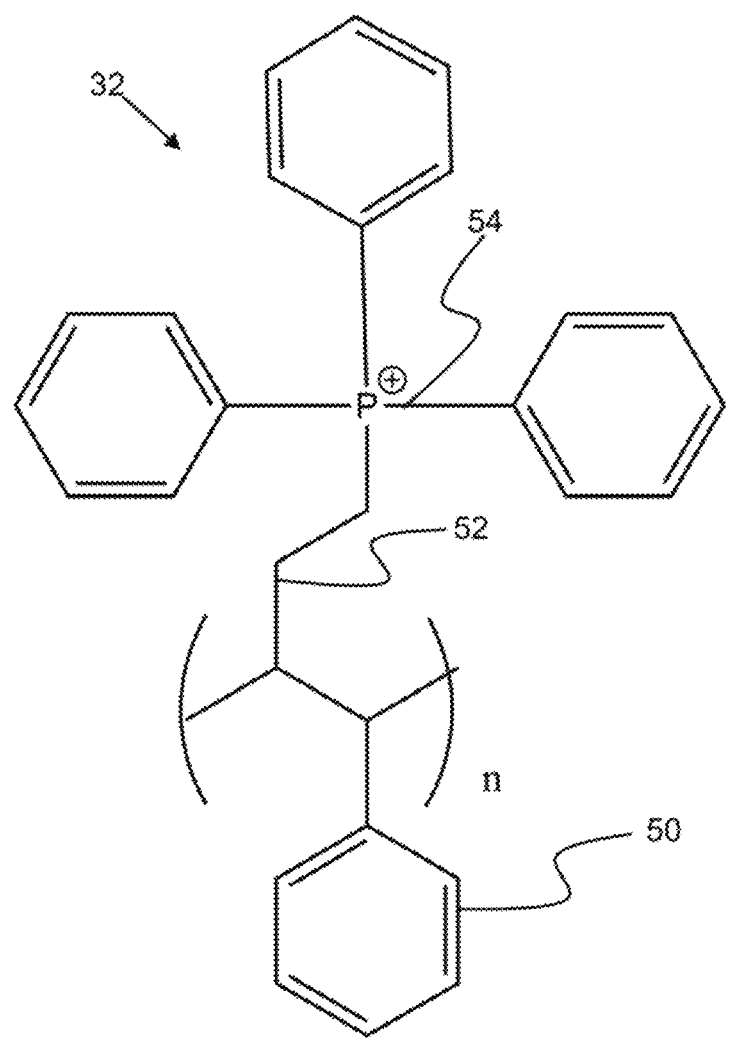

FIGS. 13 to 15 show molecular diagrams for an exemplary anion conducting polymers having a backbone, a side chain and a functional group. FIG. 13 shows an exemplary anion conducting polymer having a quaternary ammonium functional group 54, a piperidine side chain 52, and a poly(styrene) backbone 50. FIG. 14 shows an exemplary anion conducting polymer having a quaternary ammonium functional group 54, an alkyl side chain 52 and a poly(arylene) or poly(phenylene) backbone 50. FIG. 15 shows an exemplary anion conducting polymer having a phosphonium functional group 54, an alkyl side chain 52 and a poly(styrene) backbone 50.

Figure 16:
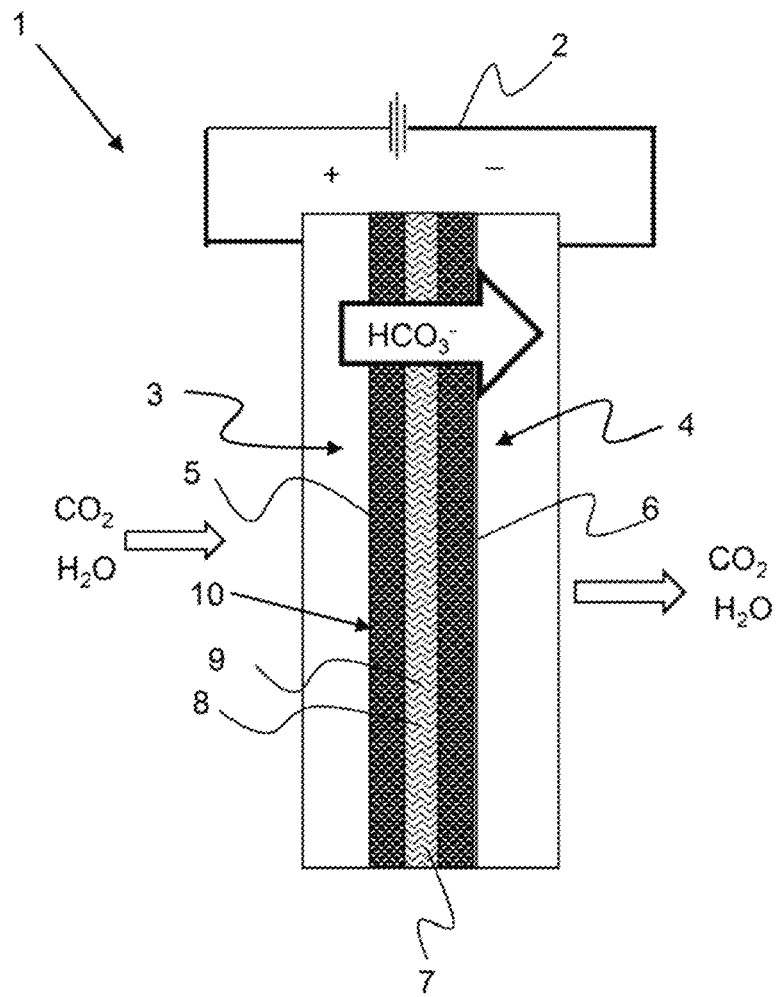
FIGS. 16 and 17 show a schematic of a carbon dioxide electrochemical system.
Figure 17:
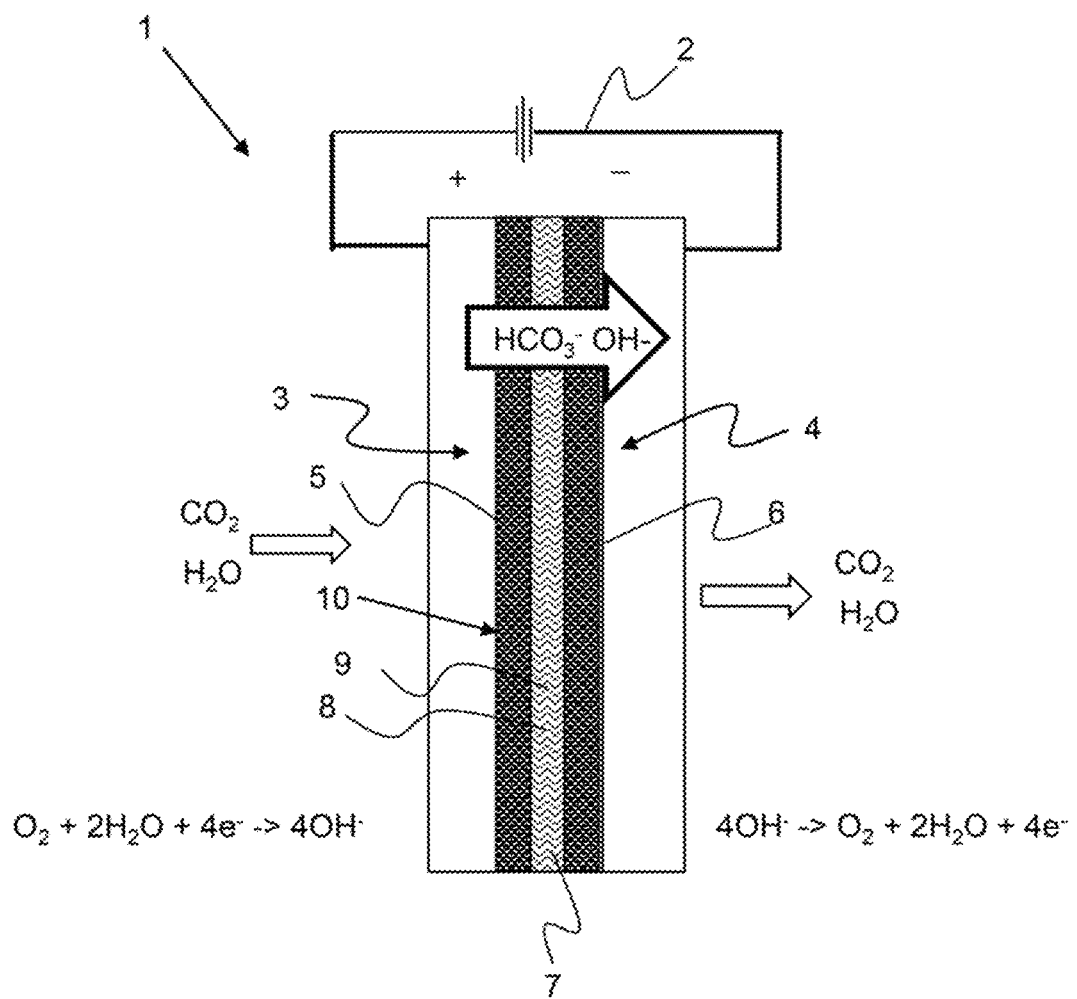
Figure 18:
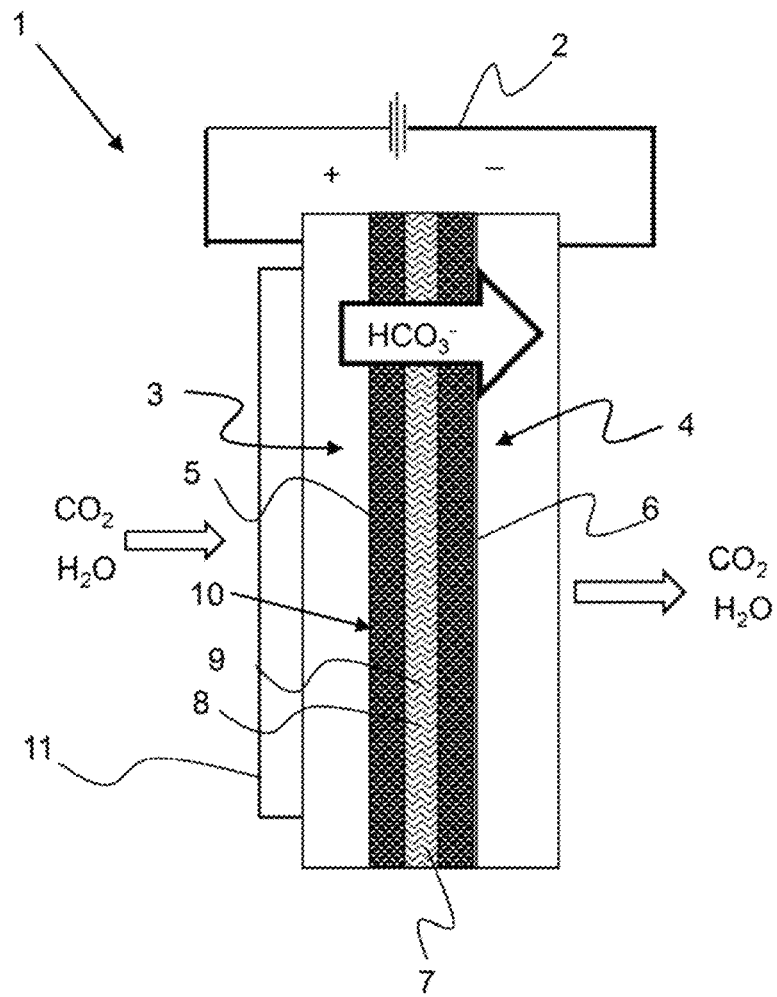
FIG. 18 shows a schematic of a carbon dioxide electrochemical system with an MEA air moving device.

Referring now to FIGS. 16 to 18, an exemplary carbon dioxide electrochemical system 1 pumps carbon dioxide from the anode 5 to the cathode 6. The exemplary carbon dioxide electrochemical system comprises a power supply 2 connected to a membrane electrode assembly 10 comprising an anode 5 and cathode 6 separated by an anion conducting layer 7. The anion conducting layer 7 may comprise an anion conducting polymer 8 and a support material 9, such as a porous polymer material. The device may be equipped with a MEA air moving device 11, as shown in FIG. 18. As shown in FIG. 16, the carbon dioxide gas is dissolved in the water, and is partially converted to carbonic acid, which is in equilibrium with bicarbonate anion as shown by the anode equation. The power supply produces a voltage potential between the anode and cathode to change the pH. The bicarbonate is driven across the anion conducting layer 7 by the gradient in pH from the anode to the cathode and is mobile inside the anion exchange membrane, and diffuses or is transported across the membrane, as shown in FIG. 1. The bicarbonate reacts on the cathode to reform carbon dioxide as shown by the Cathode equation in FIG. 16. As shown in FIG. 17, hydroxyl ions are depleted which drives the equilibrium to the right, or to the formation of carbon dioxide. As shown in FIG. 17, hydroxyl ions are produced at the anode driving the equilibrium to the formation of bicarbonate. The hydroxyl ion formation and depletion are controlled by the potential produced by the power supply across the anode and cathode in the presence of oxygen. The working fluid comprises water, carbon dioxide and oxygen. Therefore, carbon dioxide is essentially pumped from the anode to the cathode. The voltage may be oscillated or maintained at a set value for a period of time.

Figure 19:
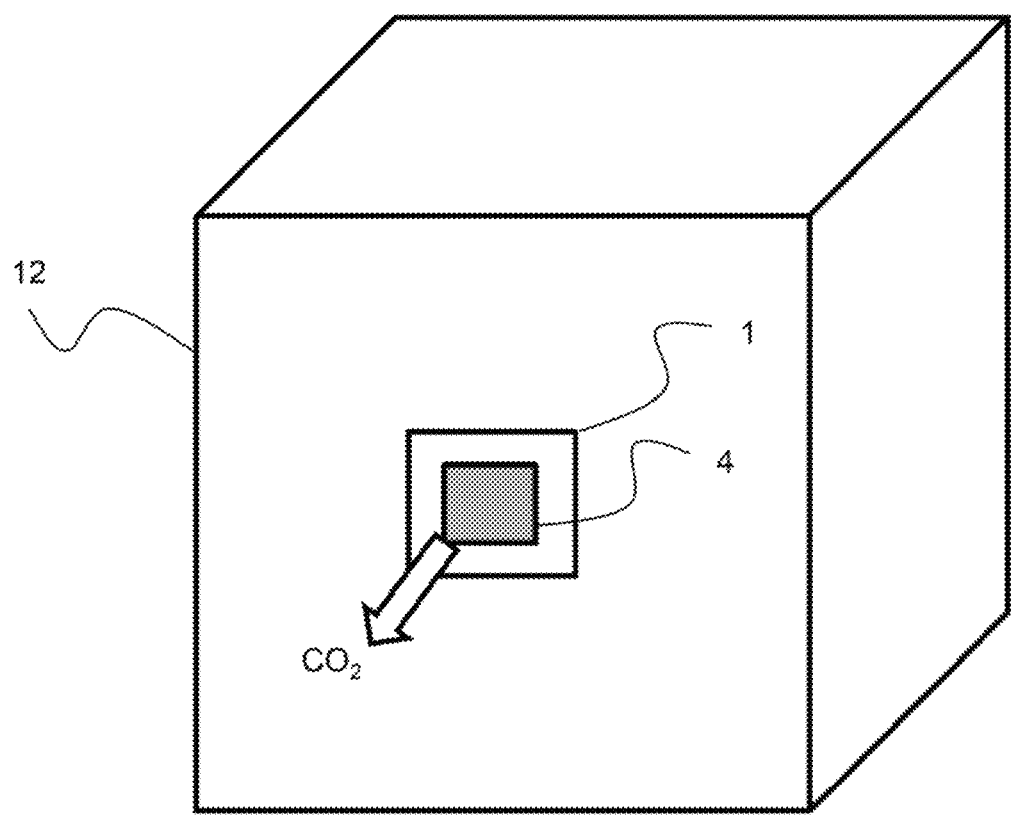
FIG. 19 illustrates the use of a carbon dioxide electrochemical system for removing $CO_2$ from an enclosure.

As shown in FIG. 19, the carbon dioxide electrochemical system 1 may be in fluid contact with an enclosure 12. The anode side 3 is outside of the box to allow the removal of carbon dioxide from the enclosure 12.

Figure 20:
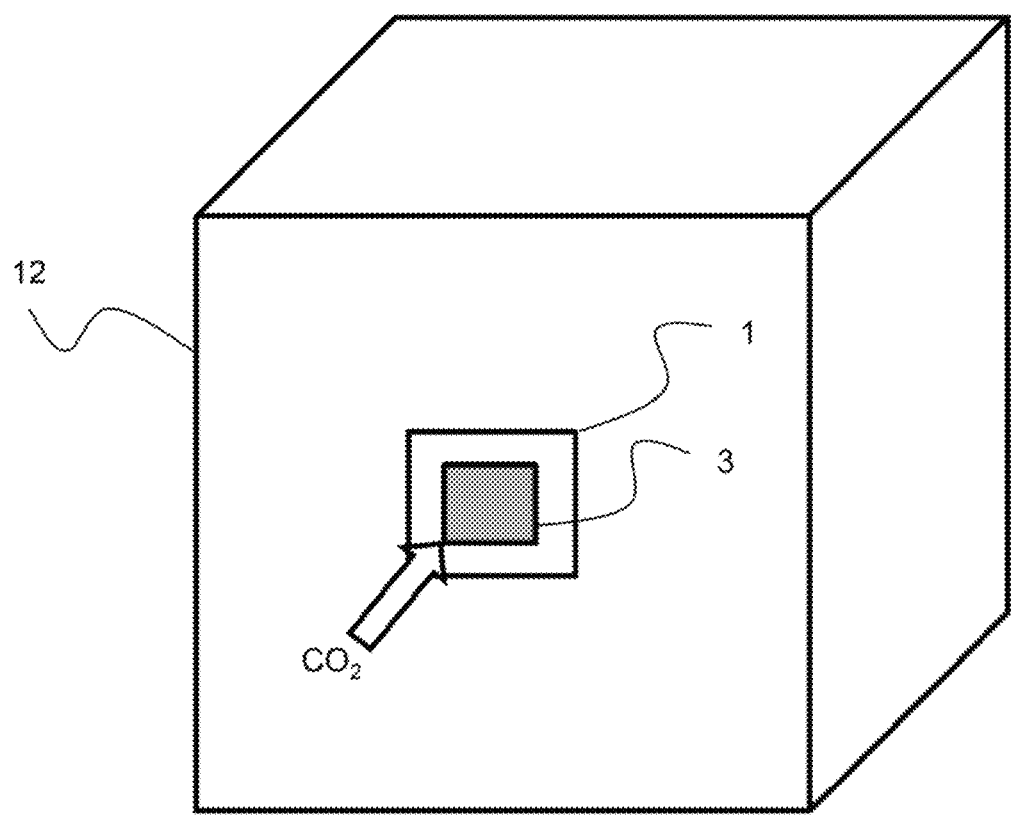
FIG. 20 illustrates the use of a carbon dioxide electrochemical system for adding $CO_2$ to an enclosure.

As shown in FIG. 20, the carbon dioxide electrochemical system 1 may be in fluid contact with an enclosure 12. The cathode side 4 is outside of the box to allow the addition of carbon dioxide from the enclosure 12

Referring now to FIG. 21 In one embodiment, the invention provides an ionomer (7-Bromo-1,1,1-trifluoroheptan-2one (2)) was prepared according to literature or purchased commercially (ref: 647831-24-1 Molbase). Accordingly, a mixture of 2 trifluoroMethyl Ketone [nominal] (1.12 g, 4.53 mmol), 1 BiPhenyl (0.70 g, 4.53 mmol), methylene chloride (3.0 mL), trifluoromethanesulfonic acid (TFSA) (3.0 mL), and a magnetic stirring bar was stirred at room temperature under nitrogen. After ten hours, the reaction mixture solution became highly viscous and kept being stirred for an additional two hours. The resulting dark-brown, gel-like mass was then shredded with sonication and poured slowly into methanol. White fiber formed was filtered and washed with hot methanol. After drying under vacuum, 1.70 g of white fiber-like solid was obtained (97% yield). Or alternatively, a polymer according to the same general formula where in each of R1 and R2 is, independently, a linear alkyl chain or a cyclic alkyl chain, and Z is selected from a group consisting of: a linear alkyl chain, a cyclic alkyl chain, and an alkylene ether chain.

The polymer is then dissolved in methanol (or one of generally well known organic solvents such as DMSO) at a 5% weight ratio i.e. 1 gram of polymer, 19 grams of methanol.

The mixture was then poured onto a 12 micron thick (Ref MBU200.012) expanded PTFE membrane supplied by TTG Inc. The mixture was then spread using a draw bar, and dried using a hot air dryer.

This process was repeated. The resulting membrane was 15 microns thick. The membrane was tear resistant, and folded comfortably without breakage. It was therefore mechanically suitable for use, and thin. Those skilled in the art, can appreciate that this process can be performed on a roll to roll, composite production system, with rollers, and draw bars in place; with hot air or other types of ovens in a generally continuous process.

The membrane was then functionalized by dipping the membrane in trimethylamine in solution with water to provide ion exchange capacity with quaternized ammonium hydroxide.

Embodiments of the invention involve composites include a new class of quaternized ammonium hydroxide-containing polymers prepared from a styrene-butadiene block copolymer (SEBS). This new class of polymers may be used in alkaline exchange membranes (AEMs), lack an arylene ether linkage in the polymer main-chain, and can prepared with any of a number of quaternized ammonium groups in the polymer side-chains.

A SEBS, compound I, is employed where x and y are mol % of each repeating unit and $2x+y=100$. For example, in some embodiments of the invention, x is 15 and y is 70. Other values are possible, of course, as will be recognized by one skilled in the art. An iridium-catalyzed borylation is then performed using bis(pinacolato)diboron (B2Pin2) to introduce a boronic ester group into the aromatic rings of the SEBS, yielding compound II.

Polymers according to embodiments of the invention may be employed in any number of contexts, including, for example, as fuel cell alkaline exchange membranes, fuel cell ionomers, electrolysis alkaline exchange membranes, as actuators, and in any number of battery applications, as will be apparent to one skilled in the art.

One skilled in the art will also recognize, of course, that various changes, additions, or modifications of or to the methods described above may be made without substantively altering the compounds obtained or their characteristics. Such changes, additions, and modifications are therefore intended to be within the scope of the invention.

Figure 25:
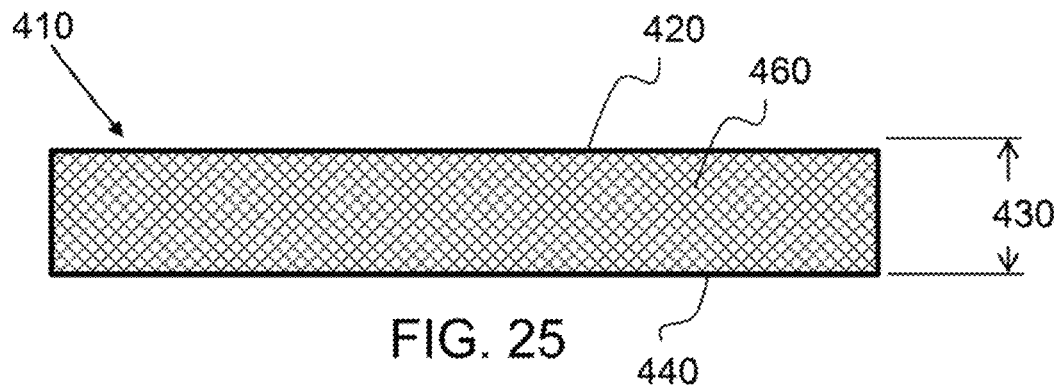
FIG. 25 shows an exemplary porous scaffold having a first side an opposing second side and pores.

As shown in FIG. 25, an exemplary porous scaffold 410 has a thickness 430 from a first side 420 to an opposing second side 440. The porous scaffold has pores 460 and an open structure that extends from the first to the second side to allow a flow of fluid from a first to the second side. The porous scaffold is permeable and will have a bulk flow of air from the first to the second side.

Figure 26:
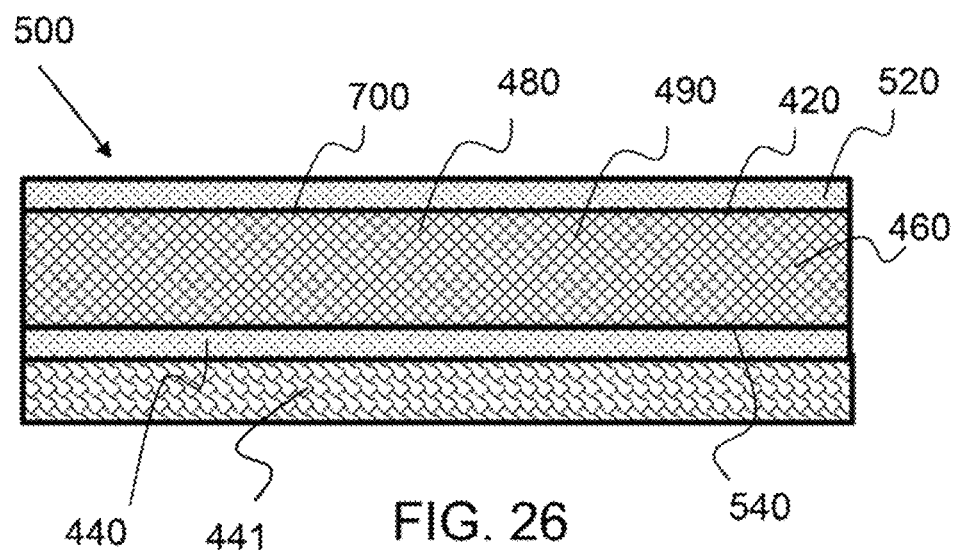
FIGS. 26 and 27 show a cross-sectional diagram of a composite anion exchange membrane comprising a porous scaffold, a pre-polymer that has functional groups thereon.
Figure 27:
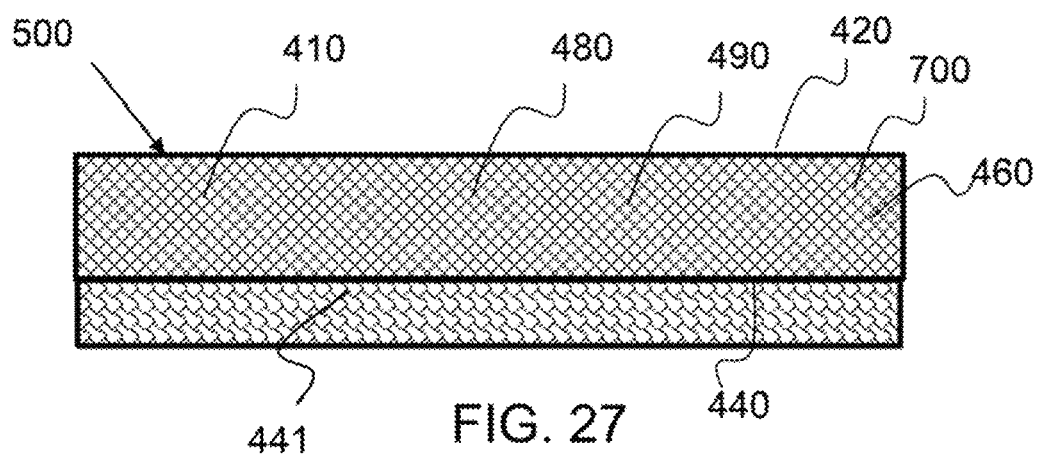

FIGS. 26 and 27 show a cross-sectional diagram of a composite anion exchange membrane 500 comprising a porous scaffold 410, a pre-polymer 480 that has functional 490 groups thereon. As shown in FIG. 26, the pre-polymer forms a surface coating layer 520 on the first side 420 and a surface coating layer 540 on the second side 440 of the porous scaffold. As shown in FIG. 27, there is substantially no surface coating layer. The functionalized pre-polymer is an anion exchange polymer 700. Note that a wick 441 may be used to provide hydration to the anion exchange membrane from a water source.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An environmental control system that is coupled with an enclosure and comprises:
   a) an electrochemical system comprising a membrane electrode assembly comprising:
      i) an anode;
      ii) a cathode,
      iii) an anion conducting layer configured between and in contact with the anode and the cathode and comprising an anion conducting polymer;
   b) a working fluid;
   c) a power supply coupled electrically with the anode and the cathode to produce a voltage potential across the anode and the cathode;
   wherein the membrane electrode assembly is in fluid communication with said enclosure; wherein the voltage potential at the anode produces hydroxyl ions and wherein the voltage potential at the cathode consumes hydroxyl ions to create a pH gradient to transfer the working fluid from the anode to the cathode.

2. The environmental control system of claim 1, further comprising a membrane electrode assembly air moving device that produces a flow of the working fluid onto the anode.

3. The environmental control system of claim 1, wherein the working fluid comprises carbon dioxide and one of either oxygen or air.

4. The environmental control system of claim 2, wherein the carbon dioxide is in equilibrium with bicarbonate ions and wherein the bicarbonate ions are transported through the anion conducting layer from the anode to the cathode and reformed into carbon dioxide at the cathode.

5. The environmental control system of claim 1, wherein the anion conducting polymer comprises quaternary ammonium functional groups.

6. The environmental control system of claim 1, wherein the anion conducting polymer comprises pyridinium functional groups.

7. The environmental control system of claim 1, wherein the anion conducting polymer comprises alkyl or a piperidine side chain configured between a functional group and a backbone of the anion conducting polymer.

8. The environmental control system of claim 1, wherein the anion conducting polymer comprises a backbone selected from the group consisting of: poly(arylene), poly(phenylene), poly(phenylene oxide), poly(sulfone), and poly(styrene-b-ethylene-b-butadiene-b-styrene) copolymers.

9. The environmental control system of claim 1, wherein the anion conducting polymer comprises:
   a) quaternary ammonium or pyridinium functional groups;
   b) a backbone selected from the group consisting of: poly(arylene), poly(phenylene), poly(phenylene oxide), poly(sulfone), and poly(styrene-b-ethylene-b-butadiene-b-styrene) copolymers; and
   c) an alkyl or piperidine side chain configured between a functional group and a backbone of the anion conducting polymer.

10. The environmental control system of claim 1, wherein the anion conducting layer is a composite anion conducting layer comprising a support material attached to the anion conducting polymer.

11. The environmental control system of claim 1, wherein the anion conducting layer has a thickness between 5 and 50 microns.

12. The environmental control system of claim 1, wherein the anode comprises an electrode comprising an anion exchange ionomer and a catalyst.

13. The environmental control system of claim 12, wherein the catalyst of the anode is selected from the group consisting of: iridium, iridium oxides, platinum, ruthenium, ruthenium oxides, manganese oxides, nickel-cobalt oxides, and perovskites.

14. The environmental control system of claim 1, wherein the cathode comprises an electrode comprising an anion exchange ionomer and a catalyst.

15. The environmental control system of claim 14, wherein the catalyst of the cathode is selected from the group consisting of: platinum, platinum supported on carbon, silver, silver supported on carbon, manganese oxides, or perovskites.

16. The environmental control system of any of claim 1, wherein the enclosure is a vehicle.

17. The environmental control system of claim 1, wherein the enclosure is an aircraft.

18. The environmental control system of claim 1, wherein the enclosure is submarine.

19. The environmental control system of claim 1, wherein the enclosure is greenhouse.

20. The environmental control system of claim 1, wherein the electrochemical system further comprises a wick coupled with the anion conducting layer to hydrate the anion conducting layer.

* * * * *